April 3, 1934.　　　　　H. T. GOSS　　　　　1,953,598

FLUID DISPENSING

Filed Oct. 3, 1931　　　3 Sheets-Sheet 1

INVENTOR
HARRY T. GOSS
BY HIS ATTORNEYS
Bohleber + Ledbetter

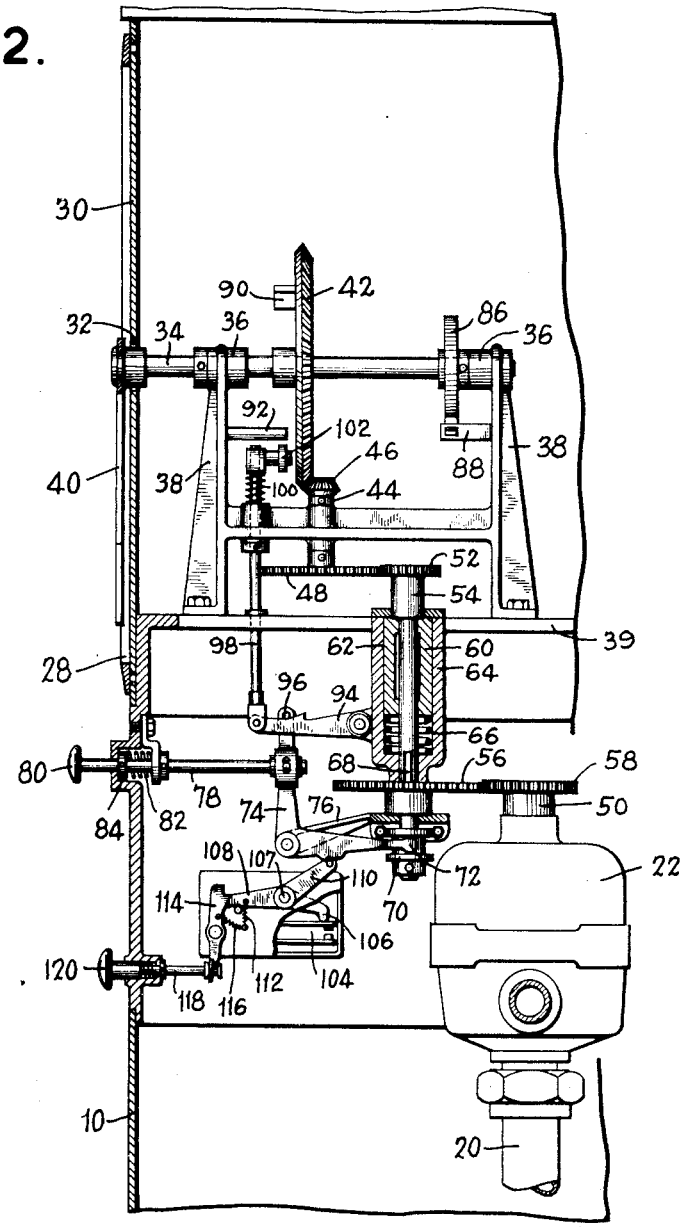

April 3, 1934.  H. T. GOSS  1,953,598
FLUID DISPENSING
Filed Oct. 3, 1931  3 Sheets-Sheet 3
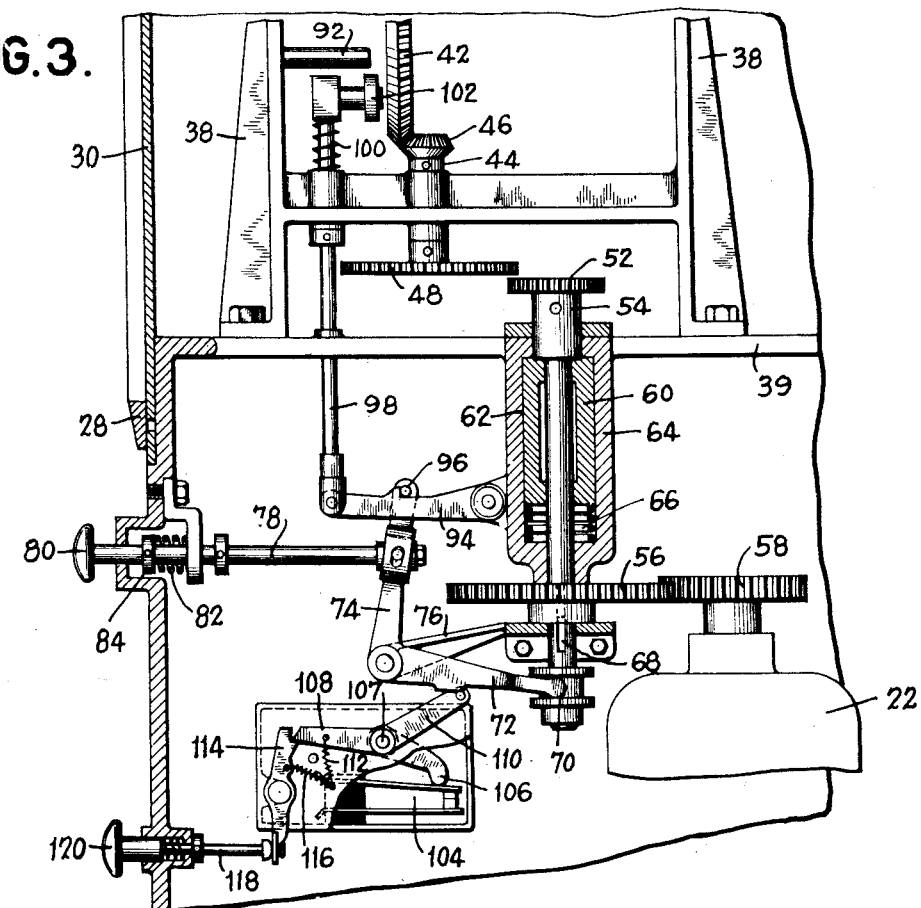
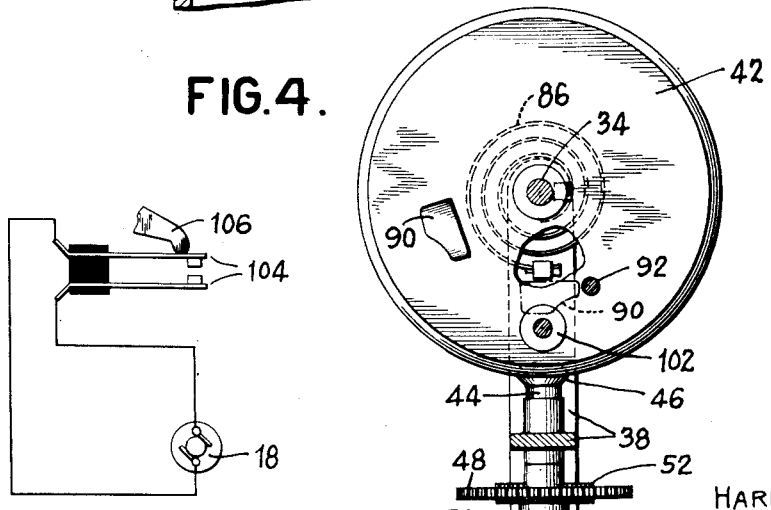
INVENTOR
HARRY T. GOSS
BY HIS ATTORNEYS
Bohleber & Ledbetter Patented Apr. 3, 1934

1,953,598

UNITED STATES PATENT OFFICE 1,953,598

FLUID DISPENSING

Harry T. Goss, Rutherford, N. J., assignor to L. N. S. Corporation, New York, N. Y., a corporation of Delaware Application October 3, 1931, Serial No. 566,606

21 Claims. (Cl. 221—95)

This invention relates broadly to fluid dispensing devices such as are adapted to dispense gasoline and other liquid fuels at roadside service stations and the like of the kind in which the elevation of the fluid, as from a tank, is effected by means of a pump.

In fluid dispensing devices heretofore known, the volume of fluid delivered from the nozzle has been indicated either by a pointer traveling over an indicating dial or by a dial traveling past an index. In either event the relative movement between the index or pointer and the dial is effected from a fluid metering device recording such volume of fluid. In such fluid dispensing devices the indicating means has usually been manually returned to zero or in the instance where the return of the indicating device to initial position has been automatic, the release of such indicating device has been manually controlled so that a dishonest salesman, by working quickly, can cause the indicator to stop before it has returned all the way to zero and thus short-measure the purchaser.

One object of the present invention is to provide indicating mechanism for a fluid dispensing device in which the return to the initial position or zero of the indicator, while being initiated manually, is automatic in the sense that, once the return to zero is initiated, it cannot be manually halted and the dispensing device used to effect a sale, before the indicating means reaches initial position. The invention also seeks to provide a fluid dispensing device which is practical from the standpoint of ease and cheapness of manufacture and convenience and durability in use.

While the invention has been illustrated as applied to a fluid dispensing apparatus making use of an automatically operated pump which is manually started and stopped, it will be apparent that the invention is equally applicable where the pump is manually operated or where the operation of a power driven pump is automatically initiated.

In carrying the invention into effect, manually operated means are provided to disconnect the indicating means from the metering means. Power means are then provided to return the indicating means to initial position. So soon, however, as the indicating means is released from the metering means, the releasing means is held in released position until the indicating means reaches initial position when the releasing means is automatically freed to reconnect the indicating means and the metering means. More particularly, gearing between the meter shaft and an indicating hand, normally held in mesh by spring pressure, is manually moved out of mesh to permit the hand to be returned to zero and latching means are provided to hold the gearing out of mesh against the action of the spring. When the hand reaches zero position means carried thereon or controlled thereby automatically releases the latching devices and permits the spring to bring the gearing into mesh again.

These and other objects of the invention and the means for their attainment will be more apparent from the following detailed description, taken in connection with the accompanying drawings showing a preferred embodiment thereof, and in which:

Figure 2 is a fragmentary view, in vertical section, showing the operative connections between the meter and the indicating means in position whereby rotation of the meter shaft will actuate the indicating devices;

Figure 3 is a view on an enlarged scale showing the releasing means for the indicating devices latched in position to hold the gearing disconnected;

Figure 4 is a fragmentary view taken in the plane indicated by the broken line 4—4 of Figure 2, looking in the direction of the arrows, and showing details of construction; and Figure 5 is a wiring diagram of the motor circuit.

Figure 1:
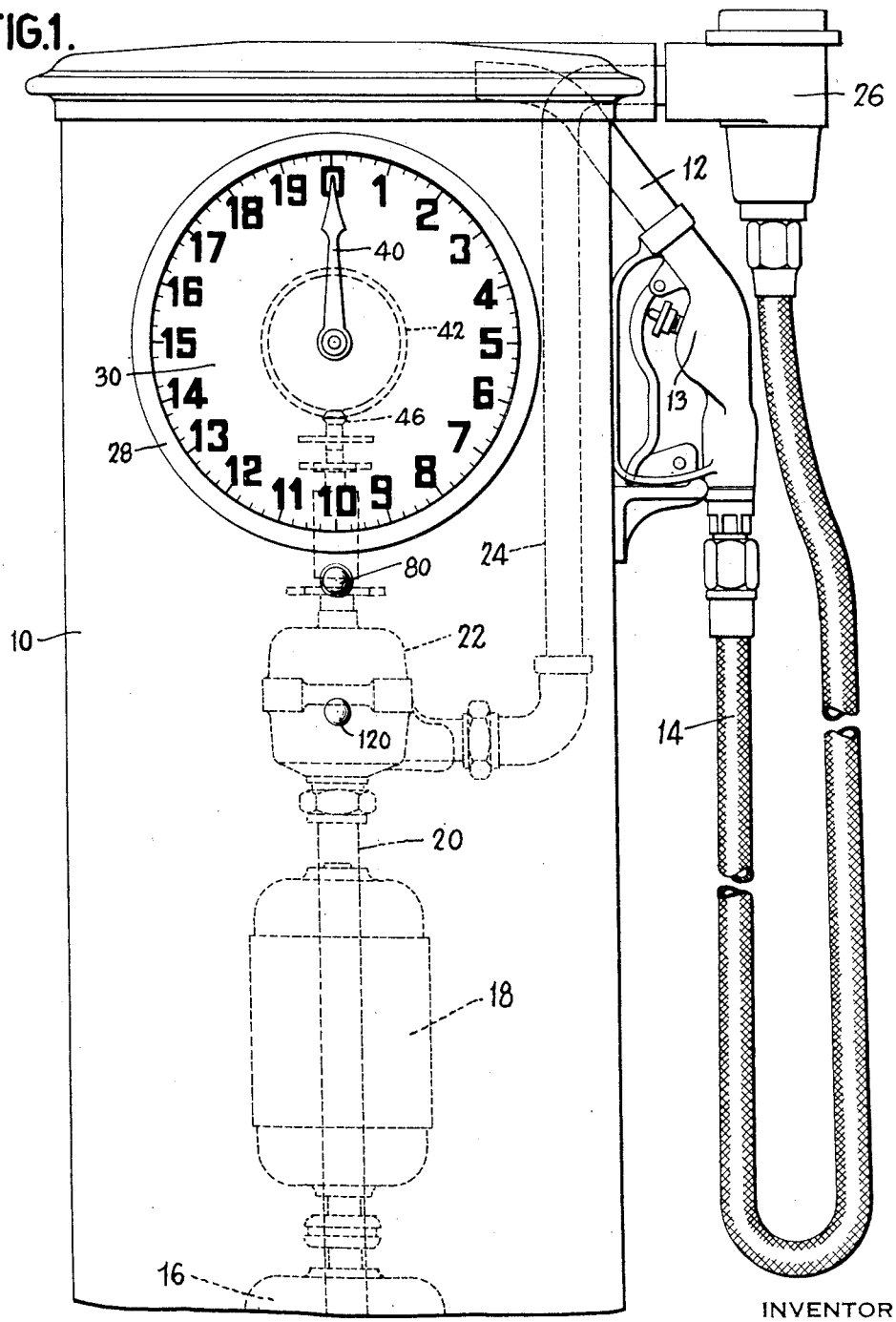
Figure 1 is a view in side elevation of a fluid dispensing apparatus to which the invention is applied.

In the illustrated embodiment, a dispensing standard or housing 10 of any convenient shape, is adapted to support and contain the devices for elevating liquid from a tank (not shown), say, beneath the ground and for measuring it for delivery from a valve controlled nozzle 12 on the end of a hose 14 into, say, the fuel tank of a motor vehicle. Liquid elevating means, such as a pump 16, driven by a motor 18 establishes the flow of the liquid through the pipe 20 to meter 22 from which the liquid passes by a pipe 24 to the connection 26 for the hose 14. The pump 16, motor 18 and meter 22 are indicated in dotted lines in Figure 1.

In the front of the housing and at a desirable elevation where it may be easily visible, or, if desired, at both the front and back, the housing 10 is formed with an opening or window 28 behind which a dial 30 is disposed. The dial is in turn formed with an opening 32 through which the arbor 34 passes, the arbor being journaled in bearings 36 in a frame 38 carried within the housing 10. On the end of the arbor outwardly of the dial 30 is an indicating hand 40. The arbor carries a beveled gear 42 by which it and the hand 40 are rotated in recording the number of units of measure of liquid delivered. Also shown journaled in the frame 38 is a vertically disposed stub shaft 44 carrying at its upper end a beveled pinion 46 always in mesh with the beveled gear 42 and at its lower end a gear 48 which is rotated through intermediate connections from the meter shaft 50. These connections comprise a pinion 52 meshing with the gear 48 and secured to the upper end of a shaft 54. On the lower end of shaft 54 is a gear 56 driven from the pinion 58 on the meter shaft 50. The shaft 54 is journaled in a sliding sleeve 60 which is fitted within a bore 62 in a supporting member 64 carried by a transverse element 39 of the standard.

Pinion 58 is conveniently of a width such that the gear 56 is always in mesh with the pinion through the permissible axial movement of the shaft 54.

The sleeve 60, and consequently the shaft 54, are movable vertically to move the pinion 52 into and out of engagement with the gear 48 to thereby connect and disconnect the indicator with the meter. The sleeve 60 is normally held in its upward position with the pinion 52 in mesh with the gear 48 by the spring 66 interposed between the sleeve 60 and the bottom of the bore 62. The gear 56 is splined to the shaft 54, as at 68, and means are provided for moving the shaft 54 vertically.

At its lower end, the shaft 54 is provided with a shoulder or grooved head 70 which is engaged by the bifurcated end 72 of a bell crank lever 72—74, or its equivalent, which is pivoted within the casing 10, say, on a frame 76. Secured to the other arm 74 of the bell crank lever is a slidable push rod 78 which extends to the outside of the casing where it is provided with a knob 80 for convenient grasp of the operator. The push rod 78 normally tends to remain in extended position by reason of the pressure of the spring 82 exerted against a disk 84 carried on the rod 78 and thus, when rod 78 is in its extended position outwardly of the casing, the gears 52 and 48 are in mesh. By exerting inward pressure against the knob 80 the bell crank lever 72—74 is rocked in a clockwise direction, as viewed in Figure 2, to depress the shaft 54 and remove the pinion 52 from engagement with gear 48 rotating the indicating hand 40 and store up power in spring 82. Means are provided for returning the hand 40 to initial position when the arbor 34 is released from the meter. In the illustrated embodiment, such means comprises a coil spring 86 secured at one end to the arbor 34 and at the other end to a bracket 88, say, on the frame 38. When the meter rotates the arbor and moves the hand 40 away from initial position the spring 86 is placed under tension, as will be obvious. When the arbor 34 is released the expansion of spring 86 rotates the hand 40 in the opposite direction, and to stop the hand at zero a lug 90 on the gear 42 is halted by a stop 92 carried on the frame.

Means are also provided to retain or latch the gears 52 and 48 out of mesh with one another or, in other words, to hold the shaft 54 in its lowermost position while the indicating means is being returned to initial position. As shown, a latching pawl or lever 94 is pivotally mounted at some convenient place, as on the cylinder 64, and this latching pawl is adapted to engage a pin 96 on the extremity of the arm 74 of bell crank lever 72—74 when the reciprocating push rod member 78 is in its innermost position and to hold said push rod 78 against the action of spring 82 and thus hold the shaft 54 in its lowermost position against action of the spring 66. The latch is so designed as to hold the push rod inwardly and is inaccessible so that the indicating means cannot be reconnected with the meter shaft until it has returned to initial position. To effect such reconnection, the end of the latch 94 is connected with the end of a sliding rod 98 normally urged in an upward direction by a spring 100. The upper end of this rod 98 is adapted to be engaged and depressed by the lug 90 when the gear 42 moving synchronously with the indicator, reaches such position that it is in contact with a stop 92 corresponding to zero or initial position of the indicating hand 40. Preferably rod 98 carries, at its upper end, a roller 102 as a bearing surface. When the bearing surface 102 is depressed and with it the rod 98 the latch 94 is depressed releasing the pin 96 and permitting spring 82 to move the push rod 78 outwardly and at the same time permitting the spring 66 to move the shaft 54 upwardly to cause the engagement of pinion 52 with gear 48 whereby the arbor 34 is again operatively connected with the meter shaft 50 whereby the delivery of fluid in the next transaction is recorded.

While the operation of the motor 18, operating the pump 16, may be manually initiated, provision is made for automatically starting the pump so that the delivery of fluid from the hose may commence so soon as the indicating means has reached initial position. To this end, at the commencement of the next transaction, that is, when the operator pushes in the rod 78 to release the indicating means 40 and permit it to be returned to initial position, the pump 16 is started so that delivery may be commenced by opening the valve 13 when the indicating means 40 reaches initial position. The motor circuit includes a pair of normally opened contacts 104. These contacts are closed by an arm 106 adapted to turn about a pivot 107 with a bell crank 108—110, the end of the arm 110 of which is disposed immediately beneath the arm 72. Thus, when the arm 72 is depressed to release the indicating means 40 for return to initial position, the movement of lever arm 72 in a clockwise direction rotates lever arm 110 in a similar direction carrying with it the arm 106 to depress and close the contacts 104. This rotation of the bell crank 108—110 is made against the action of a spring 112 normally rotating the bell crank in the opposite direction to permit the contacts 104 to open. In its extreme position of its movement in a clockwise direction, the arm 108 is elevated to a point where a latch 114 may be drawn by spring 116 beneath or in engagement with the arm 108 to hold the lever in such position that it maintains the contacts closed, as shown in Figure 3, even though the arm 72 returns to its uppermost position with the return of the shaft 54 to the meshing position of the gears 52 and 48. Thus, although the indicating means reaches initial position and lever arm 110 is released by fork 72, the pump continues to be operated to deliver measured quantities of liquid through the hose. When the required quantity of liquid has been delivered, the pump may be stopped by pushing in on the plunger 118 to trip the latch 114 and thereby release the bell crank and permit the spring 112 to rotate it in a counter-clockwise direction and enable the contacts in the motor circuit to open.

The operation of the apparatus will be apparent from the foregoing description. When a sale, say, of liquid fuel is to be made, and assuming that the hand 40 is at the zero on the dial 30 and that the gears 52 and 48 are in mesh, and the pump 16 in operation drawing fuel from its source through pipe 20, meter 22, stand pipe 24 and hose 14, to, say, the fuel tank of a motor vehicle, the passage of fuel through the meter 22 causes rotation of the shaft 50. This, in turn, through the intermediary of the gear train 58—56, causes rotation of the shaft 54 which drives, through pinion 52 and gear 48, the beveled gear 32 on the arbor 34 carrying the hand 40. This rotation of the arbor moves the hand over the dial past the numbers thereon in sequence in proportion to the number of units of measure of liquid passing through the meter. At the same time, the coil spring 86 is put under tension. After the desired quantity of fluid has been delivered in that transaction, the pump is stopped by pressing on knob 120 and opening the motor circuit. It is to be observed, however, that although a quantity of fuel has been dispensed and the amount has been observed by the purchaser, the indicating devices are retained in the indicating position until the next transaction. When ready for the next transaction, the attendant may prepare the fluid dispensing apparatus therefor. This is done by pushing in on knob 80, thereby depressing lever arm 72 and moving the shaft 54 and its pinion 52 out of mesh with the gear 48. Thus, the hand 40 is released for rotation in the opposite direction by the spring 86 to bring the hand back to the zero on the dial, where the hand comes to rest by reason of the engagement of the lug 90 on bevel gear 42 against the stop 92 on the supporting frame 38.

It will be noted that when the knob 80 is pushed in, the pin 96 on the bell crank is forced past the detent 95 and is latched by the latching lever 94 so that the shaft 54 is held in its depressed position. At the same time, the depression of lever arm 72 rotates the movable means 108—110 in a clockwise direction carrying therewith the arm 106 downwardly to close the switch contacts 104 in the motor circuit and start the motor driving the pump.

Until the valve 13 is open and liquid is delivered from the nozzle 12, all liquid elevated by the pump 16 is returned to its source through the usual by-pass provided in all dispensing apparatus for that purpose.

When the hand 40 has reached the zero on the dial, it is stopped by the lug 90 which, when in engagement with pin 92, engages the roller 102 on shaft 98 and depresses the shaft or plunger to depress the latch 94 and release the bell reciprocating member and crank 72—74 thereby permitting spring 66 to move shaft 54 upwardly and bring pinion 52 in engagement with the gear 48. The parts are then in position to record the delivery of liquid in the next transaction. Then, when fluid flows through the meter and is delivered through the nozzle 12, the delivery is recorded by the indicating hand 40. When the desired quantity of fluid has been delivered, the operator may press knob 120 to release bell crank 108—110 and permit the spring 112 to move the bell crank in a counter-clockwise direction thereby releasing contacts 104 to open the circuit and stop the operation of the pump.

It will thus be seen that a fluid dispensing apparatus has been provided in which the indicating means is manually released from the meter to permit automatic means to return the indicating means to initial position and that it is impossible to manually halt the return of the indicating means or reconnect such means with the meter but that such reconnection can only occur automatically when the indicating means has reached initial position.

Various modifications will occur to those skilled in the art in the character of the fluid elevating means, fluid delivery means, indicating means and in the operative connections between the fluid metering means and the indicating means as well as in the manner of rendering the said connections operative and inoperative and in the means for returning the indicating means to initial position as also in the means which initiates the operation of the fluid elevating means whether manually or automatically controlled, and no limitation is intended by the phraseology of the foregoing specification or illustrations in the accompanying drawings except as indicated in the appended claims.

What is claimed is:—

1. A fluid dispensing apparatus comprising fluid elevating means, a meter through which the fluid passes, said meter having a shaft the movement of which is proportional to the amount of fluid passed through the meter, indicating means, operative connections between the indicating means and the shaft, means tending to return the indicating means to initial position, manually actuated means for disconnecting simultaneously with the manual movement of said manually actuated means, the indicating means from the shaft and for initiating simultaneously with the manual movement of said manually actuated means, the operation of the fluid elevating means, and means for maintaining said disconnection until the indicating means has returned to initial position.

2. A fluid dispensing apparatus comprising fluid elevating means, a meter through which the fluid passes, said meter having a shaft the movement of which is proportional to the amount of fluid passed through the meter, indicating means, operative connections between the indicating means and the shaft, means to return the indicating means to initial position, manually actuated means for disconnecting simultaneously with the manual movement of said manually actuated means, the indicating means from the shaft and for initiating simultaneously with the manual movement of said manually actuated means, the operation of the fluid elevating means and means for maintaining said disconnection until the indicating means has returned to initial position.

3. A fluid dispensing apparatus comprising fluid elevating means, a meter through which the fluid passes, said meter having a shaft the movement of which is proportional to the amount of fluid passed through the meter, indicating means, operative connections between the indicating means and the shaft, means tending to return the indicating means to initial position, manually actuated means for disconnecting simultaneously with the manual movement of said manually actuated means, the indicating means from the shaft, and for initiating simultaneously with the manual movement of said manually actuated means, the operation of the fluid elevating means, means for maintaining said disconnection until the indicating means has returned to initial position and means to halt the operation of the fluid elevating means.

4. Fluid dispensing apparatus comprising a meter through which the fluid passes, said meter having a shaft the movement of which is proportional to the amount of fluid passed through the meter, electrically operated means to establish fluid flow through the meter comprising contacts, indicating means, operable connections between the indicating means and the meter shaft, means to return the indicating means to initial position, manually operatable means for simultaneously disconnecting the indicating means from the meter and closing the contacts, automatic means for maintaining said disconnection until the indicating means is returned to initial position, latch means automatically maintaining the contacts closed and means to open the contacts when the desired quantity of fluid has been dispensed.

5. Fluid dispensing apparatus comprising fluid elevating means and fluid metering means including a shaft the movement of which is proportional to the amount of fluid passed through the metering means, indicating means, operative connections between the shaft and the indicating means, means to return the indicating means to initial position, means initiating the operation of the fluid elevating means and disconnecting the indicating means from the shaft, means for maintaining said disconnection until the indicating means is returned to initial position, latch means for maintaining the operation of the fluid elevating means after the indicating means is returned to initial position and manually operable means to release the last mentioned maintaining latch means.

6. Fluid dispensing apparatus comprising fluid elevating means, motor means therefor and fluid metering means comprising a shaft the movement of which is proportional to the amount of fluid passed through the metering means, indicating means, operative connections between the shaft and the indicating means, means tending to return the indicating means to initial position, means to disconnect the indicating means from the shaft and to actuate motor control means to initiate the operation of the motor means, means for maintaining said disconnection until the indicating means is returned to initial position, latching means for maintaining the operation of the motor control means in operative position and manually operable means to release the last mentioned latching means.

7. Fluid dispensing apparatus comprising fluid elevating means, motor means therefor and fluid metering means comprising a shaft the movement of which is proportional to the amount of fluid passed through the metering means, means to return the indicating means to initial position, a reciprocable shaft, an indicator, gearing between the reciprocable shaft and the indicator to drive the same, operable connections between the meter shaft and the reciprocable shaft, a bell crank one arm of which is connected with the reciprocable shaft to reciprocate the same, a push rod connected with the other arm of the bell crank, spring means urging the push rod in one direction, a latch for the push rod in the other extreme position of its movement, spring means urging the latch into latching position, a reciprocable rod connected with the latch to release the same and means carried with the indicator to actuate the rod to release the latch.

8. Fluid dispensing apparatus comprising fluid elevating means, motor means therefor comprising an electrical circuit having contacts, fluid metering means comprising a shaft the movement of which is proportional to the amount of fluid passed through the metering means, an indicator, means to return the indicator to initial position, a reciprocable shaft, gearing between the reciprocable shaft and the indicator to drive the same, operable connections between the meter shaft and the reciprocable shaft, a bell crank one arm of which is connected with the reciprocable shaft to reciprocate the same, a push rod connected with the other arm of the bell crank, spring means urging the push rod in one direction, a lever engageable by the bell crank to close the contacts, a latch for the push rod in the other extreme position of its movement, spring means urging the latch into latching position, a reciprocable rod connected with the latch to release the same and means carried with the indicator to actuate the rod to release the latch.

9. Fluid dispensing apparatus comprising fluid elevating means, motor means therefor comprising an electrical circuit having contacts, and fluid metering means comprising a shaft the movement of which is proportional to the amount of fluid passed through the metering means, indicating means, means to return the indicating means to initial position, a reciprocable shaft, gearing between the reciprocable shaft and the indicating means to drive the same, operable connections between the meter shaft and the reciprocable shaft, a bell crank one arm of which is connected with the reciprocable shaft to reciprocate the same, a push rod connected with the other arm of the bell crank, spring means urging the push rod in one direction, a lever engageable by the bell crank to close the contacts, spring pressed latching means to engage said last named lever in contact closing position, manual means to release said latching means, a latch for the push rod in the other extreme position of its movement, spring means urging the latch into latching position, a reciprocable rod connected with the latch to release the same and means carried with the indicator to actuate the rod to release the latch.

10. Fluid dispensing apparatus comprising a pump, a meter, indicating means, manually actuated means permitting the return of the indicating means to zero position, movable means, said manually actuated means effecting simultaneously with the manual movement of said manually actuated means, the movement of said movable means, a pump motor circuit comprising contacts, said movable means being adapted at one extreme position of its movement to close said contacts.

11. Fluid dispensing apparatus comprising an indicator, fluid flow establishing means, operating means for the flow establishing means comprising a switch, movable means to close the switch, a reciprocating member operatively connected with said movable means whereby in one position of its movement the switch is closed and in the other position of its movement the switch is opened, power storing means adapted to move said reciprocating member in one direction, manually controlled means to move said reciprocating member in the opposite direction, latching means adapted to engage and retain said reciprocating member in one extreme position of its movement, means to return the indicator to zero position, means movable with the indicator and means actuated by the movable means at zero position of the indicator to release the reciprocating member for movement under the influence of the power storing means.

12. Fluid dispensing apparatus comprising an indicator, fluid flow establishing means, operating means for the flow establishing means comprising a switch, movable means to close the switch, a reciprocating member adapted to operate said movable means whereby in one position of its movement the switch is closed and in the other position of its movement the switch is open, power storing means adapted to move said reciprocating member in one direction, manually controlled means to move said reciprocating member in the opposite direction, pivoted latching means adapted to engage and retain said reciprocating member in one extreme position of its movement, means to return the indicator to zero position, means movable with the indicator and means comprising a plunger engaging the latching means and actuated by the last named movable means at zero position of the indicator to turn the latching means about its pivot to disengage the latching means from the reciprocating member to release it for movement under the influence of the power storing means.

13. Fluid dispensing apparatus comprising an indicator, fluid flow establishing means, operating means for the flow establishing means comprising a switch, movable means to close the switch, a reciprocating member in operative relation with the movable means whereby in one position of its movement the switch is closed and in the other position of its movement the switch is open, power storing means adapted to move the reciprocating member in one direction, manually controlled means to move the reciprocating member in the opposite direction, a pivoted latching lever adapted in one position to engage and retain the reciprocating member in one extreme position of its movement, means to return the indicator to initial position, a gear rotatable synchronously with the indicator, a lug carried on said gear and a plunger engaging an end of the latching lever and depressed by the lug at initial position of the indicator to depress the end of the lever and move the latching lever out of engagement with the reciprocating member to release it for movement under the influence of the power storing means.

14. Fluid dispensing apparatus comprising an indicator, means to return the indicator to initial position, fluid flow establishing means, a meter through which the fluid flows, operative connections between the meter and the indicator comprising a gear rotating synchronously with the indicator, operating means for the flow establishing means comprising a switch, movable means to close the switch, a reciprocating member, operative connections with the reciprocating member actuating the movable means whereby in one position of the movement of said reciprocating member the switch is closed and in the other position of its movement the switch is opened, power storing means adapted to move the reciprocating member in one direction, manually controlled means to move the reciprocating member in the opposite direction, stop means carried by the reciprocating member, a pivoted latching lever adapted to engage the stop means to retain the reciprocating member in one position of its movement, a plunger engaging an end of the lever and a lug carried with the gear and engaging and depressing the plunger at initial position of the indicator to depress the end of the lever to move the lever out of engagement with the stop means and release the reciprocating member for movement under the influence of the power storing means.

15. Fluid dispensing apparatus comprising an indicator, means to return the indicator to initial position, means movable synchronously with the indicator, fluid flow establishing means, operating means for the flow establishing means comprising a switch, switch closing means, power storing means moving said switch closing means in one direction, manually controlled means moving the switch closing means in the opposite direction, latching means retaining said switch closing means in one position of movement and means actuated by said movable means to release said latching means from the switch closing means.

16. Fluid dispensing apparatus comprising an indicator, means to return the indicator to initial position, means movable with the indicator, fluid flow establishing means, operating means for the flow establishing means comprising a switch, a reciprocating member, power storing means adapted to move the reciprocating member in one direction, a bell crank lever one arm of which is operatively connected with the reciprocating member, switch closing means actuated by the other arm of the bell crank lever and latching means adapted to engage and retain the reciprocating member in one position of its movement and actuated by the movable means to release the reciprocating member for movement under the influence of the power storing means.

17. Fluid dispensing apparatus comprising an indicator, means to return the indicator to initial position, fluid flow establishing means, operating means for the flow establishing means comprising a switch, a reciprocating member, a bell crank lever one arm of which is operatively connected with the reciprocating member, means to close said switch actuated by the other arm of the bell crank, manually controlled means to move the reciprocating member in one direction, power storing means to move the reciprocating member in the opposite direction, latching means adapted to engage and retain the reciprocating member in one position of its movement, a gear rotatable synchronously with the indicator, a lug carried with the gear and a plunger engaged and depressed by the lug at initial position and engaging and moving the latching means out of engagement with the reciprocating member to release it for movement under the influence of the power storing means.

18. Fluid dispensing apparatus comprising a meter, indicating means, a pump, a pump motor circuit comprising contacts, movable means adapted at one extreme position of its movement to close said contacts, manually actuated means permitting the return of the indicating means to zero position and comprising a bell crank one arm of which actuates said movable contact closing means and a reciprocating rod connected with the other arm of the bell crank, a latch engaging and retaining the rod in one extreme position of its movement, means to return the indicating means to zero position, means movable with the indicating means and means comprising a plunger engaging the latch and actuated by the last named means at zero position of the indicating means to disengage the latch from the rod to release it for movement.

19. Fluid dispensing apparatus comprising an indicator, fluid flow establishing means, operating means for the flow establishing means comprising a switch, means to close the switch, means to insure the return of the indicator to zero position comprising a disconnectible connection and means to return the indicator to zero position, manually actuatable reciprocating means controlling the switch closing means and actuating the disconnectible connection, pivoted latching means adapted to retain said reciprocating means in one extreme position of its movement, means movable synchronously with the indicator and means comprising a plunger engaging the latching means and actuated by the last named movable means at zero position of the indicator to turn the latching means about its pivot to release the reciprocating means for movement.

20. Fluid dispensing apparatus comprising an indicator, fluid flow establishing means, operating means for the flow establishing means comprising a switch, movable means to close the switch, a switch control bell crank lever one arm of which extends substantially upwardly and the other arm of which actuates the movable switch closing means, a rod axially movable between two positions and connected at one end to the upwardly extending arm of the bell crank, a pivoted latching lever adapted to retain the axially movable rod in one position of its movement, means to return the indicator to zero position, a gear movable with the indicator, a lug on the gear and means comprising a plunger engaging the latching lever and depressed by the lug at zero position of the indicator to turn the latching lever about its pivot to release the rod for movement in the opposite direction from latch retained position and thereby the second named arm for upward movement.

21. Fluid dispensing apparatus comprising an indicator, fluid flow establishing means, operating means for the flow establishing means comprising a switch, means to return the indicator to zero position, reciprocating switch closing means, a latch engaging and retaining the reciprocating switch closing means in one position of its movement, means movable synchronously with the indicator, latch actuating means engageable with the movable means only when the indicator is at zero position to disengage the latch from the reciprocating switch closing means to release said switch closing means for movement.

HARRY T. GOSS.